United States Patent

[15] 3,641,923

Wilkinson

[45] Feb. 15, 1972

[54] APPARATUS FOR DEEP FAT FRYING OF FOODSTUFFS

[72] Inventor: Raleigh J. Wilkinson, Arlington Heights, Ill.

[73] Assignee: The Quaker Oats Company, Chicago, Ill.

[22] Filed: Dec. 16, 1969

[21] Appl. No.: 885,422

[52] U.S. Cl....................................99/404, 99/271, 99/444
[51] Int. Cl................................................A47j 37/12
[58] Field of Search................99/404, 405, 407, 443 C, 271, 99/375, 400, 406, 408, 425, 444, 446; 198/172, 173, 174

[56] References Cited

UNITED STATES PATENTS

| | | | |
|---|---|---|---|
| 2,828,684 | 4/1958 | Graham et al. | 99/271 X |
| 2,853,937 | 9/1958 | Peck | 99/404 |
| 3,270,662 | 9/1966 | Flodin et al. | 99/404 |

FOREIGN PATENTS OR APPLICATIONS

| | | | |
|---|---|---|---|
| 998,725 | 9/1951 | France | 99/404 |

*Primary Examiner*—Walter A. Scheel
*Assistant Examiner*—Alan I. Cantor
*Attorney*—Milton C. Hansen and Donnie Rudd

[57] ABSTRACT

An apparatus is disclosed for use in the deep fat frying of food products. The apparatus includes a continuous looped tube with an entry port at one end and a discharge port on the bottom of the upper portion of the loop. Intermittently spaced perforated plates are pulled around the loop by a pair of chains, and a means is provided for supplying an inert atmosphere to the top of the loop.

1 Claim, 5 Drawing Figures

PATENTED FEB 15 1972
3,641,923
SHEET 1 OF 2
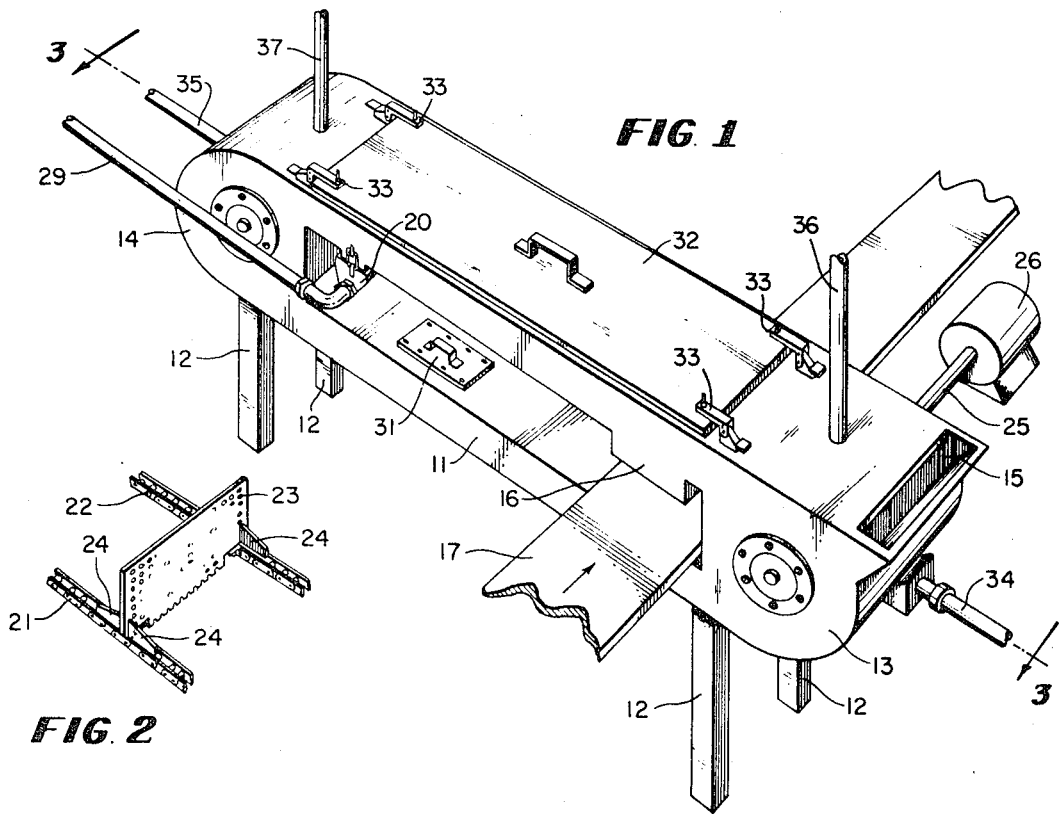
FIG. 1
FIG. 2
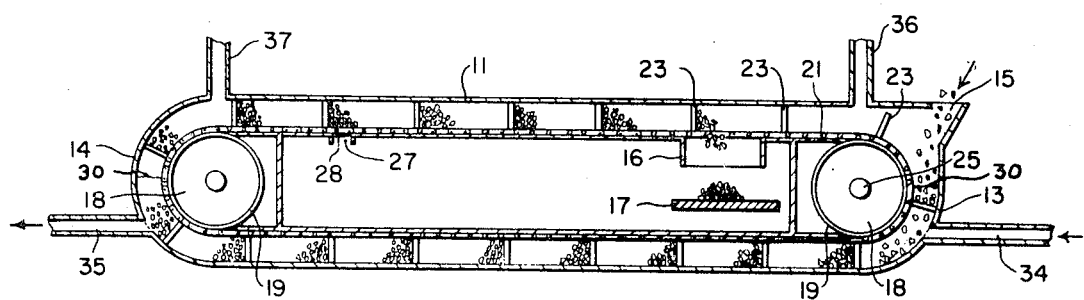
FIG. 3
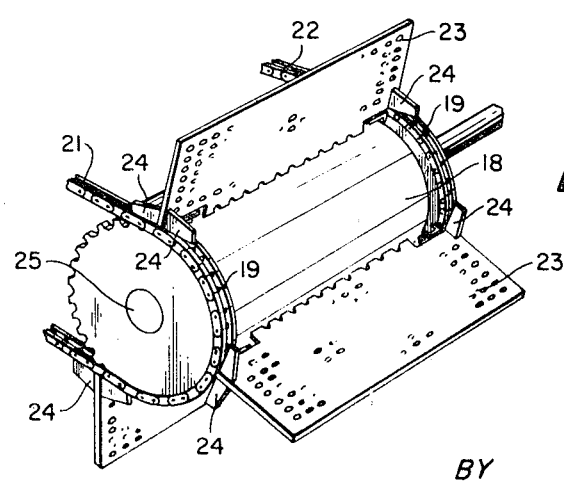
FIG. 4
INVENTOR:
RALEIGH J. WILKINSON
BY Donnie Rudd
ATTORNEY 3,641,923

APPARATUS FOR DEEP FAT FRYING OF FOODSTUFFS

BACKGROUND OF THE INVENTION

1. Field of the Invention

This invention relates to an apparatus for use in the deep fat frying of foodstuffs.

2. Description of Prior Art

There have been many different designs for an apparatus for use in the deep fat frying of foodstuffs. These designs include a substantial number in which the operation suffers from the disadvantage of being a batch process. There are also many designs which utilize a continuous deep fat frying process but have no way of overcoming the disadvantage of the cooking medium becoming rancid due to constant excess exposure to the atmosphere. My invention overcomes these disadvantages by providing a design for a deep fat fryer which substantially prevents the cooking medium from becoming rancid due to atmospheric exposure and yet provides a cooking process that is continuous in its operations.

SUMMARY OF THE INVENTION

It is an object of this invention to provide an apparatus for use in the deep fat frying of foodstuffs wherein the apparatus provides a continuous operation and wherein the apparatus also provides a minimum contact between the cooking medium and the atmosphere.

The objects of this invention are accomplished by an apparatus for use in the deep fat frying of foodstuffs, said apparatus comprising: a continuous endless looped tube, said continuous endless looped tube having an upper portion and an end portion; means for introducing material into said end portion of said tube; means for conveying material through said tube; means for discharging material from the upper portion of said tube; and means for adding to and repurifying the cooking medium in said tube.

More particularly, the objects of this invention are accomplished by an apparatus for use in the deep fat frying of foodstuffs, said apparatus comprising: a continuous tube, said continuous tube having a substantially horizontal upper portion, a substantially horizontal lower portion, a first curved end, a second curved end, and a cross-sectional area, said substantially horizontal upper portion having an underneath side, and said upper portion, lower portion, first curved end, and second curved end being connected in a continuous tube shape having a hollow continuous cavity therein; a pair of continuous parallel movable chains, said continuous parallel movable chains being movably located in said hollow continuous cavity of said continuous tube, said chains being separated horizontally by substantially the width of said hollow continuous cavity; a plurality of perforated plates, said perforated plates being substantially the size of the cross-sectional area of said continuous tube, said plurality of perforated plates being intermittently spaced in said hollow continuous cavity, and said plurality of perforated plates having opposing horizontal sides, said continuous parallel movable chains being attached one each on said opposing horizontal sides and supporting said plurality of perforated plates; means for moving said pair of continuous parallel movable chains through said hollow continuous cavity; an entrance port, said entrance port being located in said first curved end of said continuous tube; an exit opening, said exit opening being located in said underneath side of said substantially horizontal upper portion of said continuous tube; and means for adding and repurifying a cooking medium being connected to said continuous tube.

Further objects of this invention will be obvious from the disclosure hereinafter presented in conjunction with a description and explanation of the drawings.

BRIEF DESCRIPTION OF THE DRAWING

The objects of this invention are accomplished as pointed out and illustrated in the accompanying drawings in which:

FIG. 1 is a perspective view of an apparatus as claimed as my invention;

FIG. 2 is a perspective view of one of the perforated plates that moves in the continuous tube of the apparatus;

FIG. 3 is a central longitudinal sectional view of the apparatus taken on line 3—3 of FIG. 1;

FIG. 4 is a perspective view of the rotating mechanism for moving the chains and perforated plates of the apparatus;

Figure 5:
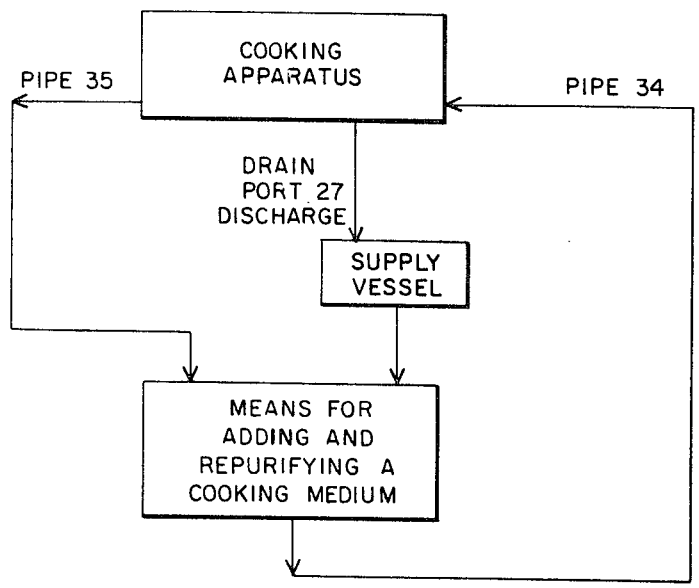
FIG. 5 is a schematic illustration of the supply vessel and means for adding and repurifying a cooking medium as disclosed herein.

In the drawings I have used the numeral 11 to refer to the continuous tube. The continuous tube 11 is supported on a stand by supports 12. The continuous tube 11 has a first curved end 13 and a second curved end 14. The first curved end 13 has an entrance port 15 for receiving the material to be deep fat fried. The upper horizontal portion of the continuous tube has a discharge port 16 where the deep fat fried material leaves the apparatus. A conveyor belt 17 is herein illustrated for conveying the cooked material away from the apparatus, but the conveyor belt does not constitute a part of this invention. In each of the curved ends of the continuous tube, a drum 18 is provided with sprockets 19 on its periphery for use in turning the chains. A pair of chains 21 and 22 are used to move the perforated plates 23 around the continuous tube. The perforated plates 23 are intermittently spaced on the chains 21 and 22 with the chains being on opposing sides of the perforated plates as is illustrated in FIG. 2 and FIG. 4. A number of simple support plates 24 are used to keep the perforated plates in an upright position as they move through the continuous tube. The chains are engaged by the sprockets with the sprockets in turn being rotated as the drum 18 moves when the shaft 25 which is attached to a motor 26 is turned by the motor.

A drain port 27 is shown in the upper portion of the continuous tube and has a screen 28 for permitting recovery and draining of a cooking medium just prior to the exit port. This cooking medium is transported back to the supply vessel by pipe 29. Inspection ports 31 and 32 are shown with attachment mechanisms 33 to facilitate easy inspection and cleaning of the apparatus. A pair of pipes 34 and 35 are shown one in each of the curved end portions of the continuous tube. These pipes 34 and 35 may alternately be used for supplying a cooking medium and for circulating it for any repurification or additive addition that is needed. A second pair of pipes 36 and 37 are shown for supplying an inert atmosphere to blanket the cooking medium and keep it out of contact with the atmosphere.

FIG. 5 is a schematic illustration showing the means for adding and repurifying a cooking medium. As is shown in FIG. 5, the cooking medium leaves the cooking apparatus from pipe 35 and goes to the means for adding and repurifying a cooking medium. Drain port 27 is shown to discharge the cooking medium into a supply vessel. The supply vessel discharges cooking medium into the means for adding and repurifying a cooking medium. The cooking medium then leaves this means and reenters the cooking apparatus by pipe 34.

A more thorough description of the functional operation of this apparatus is hereinafter described in reference to the preferred embodiment of this invention.

DESCRIPTION OF THE PREFERRED EMBODIMENT

The preferred embodiment of this invention is illustrated by the drawings FIG. 1 through 4. Referring to the drawings the operation of the preferred embodiment of this invention is as follows:

The continuous tube 11 has the inspection ports 31 and 32 sealed on to it. The tube is then charged with a cooking medium such as a liquid fat or oil through pipe 34 and 35. The level of this cooking medium 30 is approximately at the midpoint at the curved ends of the continuous tube and must not exceed the bottom of the upper portion of the continuous tube. An inert gas is supplied to the upper cavity of the continuous tube through pipe 36 and 37. It will be noted that the design of this apparatus is such that the only appreciable contact which could occur between the cooking medium and the atmosphere, is the small area in each of the curved ends, and that therefore a minimum amount of inert gas need be supplied to prevent oxidation of the cooking medium. The cooking medium is either heated by a jacket being placed around the bottom of the continuous tube or else, preferably, the cooking medium is withdrawn through pipe 35, heated to the desired temperature, and then placed back in the continuous tube through pipe 34. The perforated plates are set in motion by the motor 26 being turned on and the motor transmitting rotation through shaft 25 to drum 18. The sprockets 19 on drum 18 then engage the chains 21 and 22 and pull them around the continuous tube. The perforated plates 23 being attached to and intermittently spaced on the chains are then pulled around the continuous tube. A collection device 20 is attached to drain port 27 and pipe 29 is then used to collect any of the cooking medium that has been drained through screen 28 and return it to the cooking medium supply. Means is also provided for removing the cooked material from the apparatus as it discharges from discharge port 16. For convenience I have shown a conveyor belt 17 which can be used for this purpose.

In operation, raw or uncooked product is deposited in the entrance port 15. This material drops into the first curved end 13 as the perforated plates 23 move through the continuous tube. The perforated plates pick up the raw material and move it through the tube. The exposure of the raw material in the tube to the cooking medium produces a cooked product. The cooked product then leaves the cooking medium at the second curved end 14, wherein the cooking medium drains away from the cooked product. The cooked product is then conveyed through the remaining portion of the tube to the discharge port. It is only after the cooking medium has been substantially drained from the cooked product and the product somewhat cooled that the product and its retained oil is exposed to the atmosphere. Likewise the cooking medium is substantially free from atmospheric exposure due to the relatively small area of exposure and the ease with which this exposure can be prevented by an inert gas being supplied to the top of the continuous tube. The tremendous advantage of this apparatus is that it provides maximum cooking exposure for a product and yet provides minimum atmospheric contact to the cooking medium. This apparatus overcomes the obvious faults found in an open trough cooking wherein the cooking medium has atmospheric exposure over a substantial area.

Having fully described my new and unique apparatus for use in the deep fat frying of foodstuffs, I claim:

1. An apparatus for use in the deep fat frying of foodstuffs, said apparatus comprising:

a continuous tube, said continuous tube having a substantially horizontal upper portion, a substantially horizontal lower portion, a first curved end, a second curved end, and a cross-sectional area, said substantially horizontal upper portion having an underneath side, and said upper portion, lower portion, first curved end, and second curved end being connected in a continuous tube shape having a hollow continuous cavity therein; a pair of continuous parallel movable chains, said continuous parallel movable chains being movably located in said hollow continuous cavity of said continuous tube, said chains being separated horizontally by substantially the width of said hollow continuous cavity; a plurality of perforated plates, said perforated plates being substantially the size of the cross-sectional area of said continuous tube, said plurality of perforated plates being intermittently spaced in said hollow continuous cavity, and said plurality of perforated plates having opposing horizontal sides, said continuous parallel movable chains being attached one each on said opposing horizontal sides and supporting said plurality of perforated plates; means for moving said pair of continuous parallel movable chains through said hollow continuous cavity; an entrance port, said entrance port being located in said first curved end of said continuous tube; a cooking medium drainage port, said cooking medium drainage port being located in said underneath side of said substantially horizontal upper portion of said continuous tube immediately adjacent to said second curved end; means for conveying a cooking medium to a supply vessel, said means for conveying a cooking medium to a supply vessel being connected to said cooking medium drainage port; an exit opening, said exit opening being located in said underneath side of said substantially horizontal upper portion of said continuous tube between said cooking medium drainage port and said first curved end; means for adding and repurifying a cooking medium, said means for adding and repurifying a cooking medium drawing said cooking medium from said second curved end and adding said cooking medium at said first curved end; and means for supplying an inert atmosphere to blanket the cooking medium and keep it substantially out of contact with the air.

* * * * *